United States Patent [19]

Kunimatsu et al.

[11] 4,282,257

[45] Aug. 4, 1981

[54] PRODUCTION OF VINEGAR WITH HIGH ACETIC ACID CONCENTRATION

[75] Inventors: Yoshio Kunimatsu; Hajime Okumura; Hiroshi Masai; Koki Yamada; Mikio Yamada, all of Handa, Japan

[73] Assignee: Nakano Vinegar Co., Ltd., Japan

[21] Appl. No.: 115,419

[22] Filed: Jan. 25, 1980

[30] Foreign Application Priority Data

Feb. 13, 1979 [JP] Japan .................................. 54-14216

[51] Int. Cl.³ ............................. C12J 1/00; C12P 7/54
[52] U.S. Cl. ........................................ 426/17; 435/140
[58] Field of Search ........................... 426/17; 435/140

[56] References Cited

U.S. PATENT DOCUMENTS 4,076,844  2/1978  Ebner et al. .......................... 426/17

OTHER PUBLICATIONS

Hromatka et al., Untersuchungen über die Essiggäung, Enzymologia, vol. 15, 1953 (pp. 337–350).

*Primary Examiner*—David M. Naff
*Attorney, Agent, or Firm*—Gerald Levy

[57] ABSTRACT

Vinegar having an acetic acid concentration higher than 18 percent weight by volume is produced in a submerged fermentation by maintaining the temperature of the fermenting broth after the initiation of the fermentation at 27°–32° C. until the acetic concentration of the fermenting broth reaches 12–15 percent weight by volume and thereafter maintaining the temperature of the fermenting broth at 18°–24° C.

1 Claim, No Drawings

PRODUCTION OF VINEGAR WITH HIGH ACETIC ACID CONCENTRATION

BACKGROUND OF THE INVENTION

1 Field of the Invention

This invention relates to a process for producing vinegar having a high acetic acid concentration and, more particularly, to a process for producing vinegar having an acetic acid concentration higher than 18 percent weight by volume by a submerged fermentation process.

In the following specification and claims, without exception, the concentration of acetic acid is expressed in percent weight by volume and the concentration of alcohol in percent volume by volume, and the sum of percent weight by volume of acetic acid and percent volume by volume of alcohol is called total concentration.

2. Description of the Prior Art

Hitherto, various attempts have been made for obtaining vinegar having a high acetic acid concentration by a submerged fermentation. For example, in the process described in Published unexamined patent application (Kōkai tokkyo kōhō) No. 52-15,899, vinegar having a high acetic acid concentration is obtained by a continuous batch process wherein the manner of alcohol feeding is improved and also in the processes described in Published unexamined patent application (Kōkai tokkyo kōhō) Nos. 52-79,092; 53-41,495 and 53-44,696, productions of vinegar having a high acetic acid concentration are attempted by separating a multiplication tank from an acidification tank.

However, since in an acetic acid fermentation, as the acetic acid concentration becomes higher, the inhibition of the growth of acetic acid bacteria by acetic acid, which is the main product in the acetic acid fermentation, becomes severer, vinegar having an acetic acid concentration higher than 18 percent weight by volume has never been economically produced in an industrial process and hence there remain various matters to be improved in the acetic acid fermentation. Also, in the case of producing vinegar by a submerged fermentation process, as the fermentation temperature is higher, the production of vinegar having a high acetic acid concentration becomes more difficult. Hromatka et al report in "Enzymologia", Vol. 15, 337-350 (1953) that in the production of vinegar by a submerged fermentatiion, as the total concentration of a fermenting broth becomes higher, the optimum temperature thereof becomes lower, but the report is on the production of vinegar having acetic acid concentrations up to 12 percent weight by volume, and in the reported process, the growth rate of acetic acid bacteria becomes lower due to the low fermentation temperature, which results in reducing greatly the acidification rate and makes the process unpractical from an economical view point.

SUMMARY OF THE INVENTION

The object of this invention is to provide a process for producing vinegar having an acetic acid concentration higher than 18 percent weight by volume by a submerged fermentation process without using acclimitized acetic acid bacteria while overcoming the aforesaid difficulties in the conventional processes.

That is, according to this invention, there is provided a process for producing vinegar by a submerged fermentation, which comprises maintaining the temperature of a fermenting broth at 27°-32° C. until the acetic acid concentration of the fermenting broth after the initiation of the fermentation reaches 12-15 percent weight by volume and thereafter maintaining the temperature of the fermenting broth at 18°-24° C., whereby finished vinegar having an acetic acid concentration higher than 18 percent weight by volume is obtained.

DETAILED DESCRIPTION OF THE PREFERRED EMBODIMENTS OF THE INVENTION

Now, the invention will be explained below in detail.

Hitherto, various processes have been employed in case of producing vinegar by a submerged process, but as the fermentation temperature range, temperatures of 26°-40° C., in particular 28°-32° C. have been employed throughout the total fermenting period. This temperature range is established as the optimum temperature condition in the production of vinegar by a submerged fermenting process and it has been considered to be important for minimizing the environmental change to acetic acid bacteria.

However, the inventors considered that in an acetic acid fermentation, the phase of acetic acid bacteria used in the fermentation could be generally classified into a phase of continuing the multiplication with the acidification (hereinafter, is referred to as growth phase) and a phase of stopping the multiplication and continuing the acidification only (hereinafter, is referred to as acidification phase), and the employment of a same fermentation temperature throughout the two phases was the largest cause of making it difficult to obtain a high acetic acid concentration by a conventional process. That is, as the result of various investigations by paying attention to the properties of acetic acid bacteria, the inventors found that the optimum temperature differed between the growth phase and the acidification phase, and further it was found that the temperatures conventionally employed were optimum in the growth phase but it was important in the acidification phase for keeping the activity of acidification of acetic acid bacteria to employ lower temperatures than the conventional temperatures and further it was important for restraining the inhibition of the acidification of acetic acid bacteria by acetic acid and continuing the fermentation until a high acetic acid concentration was obtained to lower the fermentation temperature at the transfer of the fermenting phase from the growth phase to the acidification phase.

However, on considering that the extreme lowering of temperature reduced the acidification activity of acetic acid bacteria in the contrast with the aforesaid find, the inventors investigated on the optimum temperature ranges in the acidification phase to the optimum temperature ranges in the growth phase by practicing the following experiments.

That is, broth prepared using alcohol, water, finished vinegar and nutrients for acetic acid bacteria was filled in a submerged fermentation tank, when the temperature in the tank became 30° C., the broth was innoculated with acetic acid bacteria, and thereafter, the temperature of the broth was controlled within the range of 26°-33° C. by means of a control thermometer. In this case, the acetic acid concentration was 6.5% weight by volume and the alcohol concentration was 3.0% volume by volume. Thereafter, when the fermentation proceeded and the acetic acid concentration became 8.0% weight by volume, alcohol having an alcohol concentration of about 50% volume by volume was begun to feed to the fermenting broth. When the fermentation further proceeded and the acetic acid concentration of the fermenting broth became about 12% weight by volume, the temperature of the fermenting broth was lowered by changing the temperature setting of the control thermometer for controlling the temperature of the fermenting broth and thereafter, while feeding the alcohol as described above, the fermentation was continued until the acidification stopped.

The experiment was repeated while changing variously the temperature controlled until the acetic acid concentration became about 12% weight by volume after the initiation of the fermentation and the temperature controlled in the subsequent acetic acid concentrations. The results are shown in Table 1, in which the mean acidification rate (A) is shown by the following equation:

$$(A) = \frac{(B) - (C)}{(D)}$$

wherein (B) is a final acetic acid concentration in percent weight by volume, (C) is an acetic acid concentration in percent weight by volume at the initiation of fermentation, and (D) is the fermentation time (hour).

TABLE 1

| (I)    | (II)   | (III) | (IV) |
|--------|--------|-------|------|
| 33° C. | 26° C. | 15.66 | 0.08 |
|        | 24° C. | 15.02 | 0.09 |
|        | 22° C. | 14.32 | 0.08 |
|        | 20° C. | 14.01 | 0.05 |
|        | 18° C. | 13.33 | 0.04 |
|        | 16° C. | 13.26 | 0.02 |
| 32° C. | 26° C. | 17.53 | 0.08 |
|        | 24° C. | 18.87 | 0.12 |
|        | 22° C. | 18.98 | 0.14 |
|        | 20° C. | 19.56 | 0.12 |
|        | 18° C. | 19.22 | 0.11 |
|        | 16° C. | 16.48 | 0.05 |
| 31° C. | 26° C. | 17.98 | 0.07 |
|        | 24° C. | 18.88 | 0.14 |
|        | 22° C. | 19.50 | 0.12 |
|        | 20° C. | 19.68 | 0.13 |
|        | 18° C. | 18.98 | 0.11 |
|        | 16° C. | 16.53 | 0.05 |
| 30° C. | 26° C. | 18.64 | 0.08 |
|        | 24° C. | 19.10 | 0.13 |
|        | 22° C. | 19.48 | 0.15 |
|        | 20° C. | 19.70 | 0.12 |
|        | 18° C. | 18.78 | 0.12 |
|        | 16° C. | 16.44 | 0.06 |
| 29° C. | 26° C. | 18.56 | 0.08 |
|        | 24° C. | 19.77 | 0.15 |
|        | 22° C. | 20.33 | 0.13 |
|        | 20° C. | 19.86 | 0.13 |
|        | 18° C. | 18.54 | 0.12 |
|        | 16° C. | 15.44 | 0.07 |
| 28° C. | 26° C. | 18.63 | 0.07 |
|        | 24° C. | 19.66 | 0.15 |
|        | 22° C. | 19.76 | 0.13 |
|        | 20° C. | 19.23 | 0.12 |
|        | 18° C. | 19.02 | 0.11 |
|        | 16° C. | 16.52 | 0.05 |
| 27° C. | 26° C. | 17.66 | 0.08 |
|        | 24° C. | 18.86 | 0.12 |
|        | 22° C. | 19.36 | 0.13 |
|        | 20° C. | 19.20 | 0.12 |
|        | 18° C. | 18.92 | 0.11 |
|        | 16° C. | 15.33 | 0.04 |
| 26° C. | 26° C. | 18.02 | 0.08 |
|        | 24° C. | 18.03 | 0.07 |
|        | 22° C. | 17.76 | 0.09 |
|        | 20° C. | 16.78 | 0.04 |
|        | 18° C. | 16.63 | 0.05 |

TABLE 1-continued

| (I) | (II)   | (III) | (IV) |
|-----|--------|-------|------|
|     | 16° C. | 14.32 | 0.02 |

(I): Temperature controlled until the acetic acid concentration becomes about 12% weight by volume.
(II): Temperature controlled after the acetic acid concentration became about 12% weight by volume.
(III): Final acetic acid concentration in percent weight by volume.
(IV): Mean acidification rate in percent weight by volume per hour.

The experimental results (the results shown in Table 1) show that it is preferred for acetic acid bacteria, increases the growth rate and the acidification rate therewith, and is necessary for obtaining a high acetic acid concentration to maintain the temperature of the fermenting broth at 27°-32° C. until the acetic acid concentration becomes about 12% weight by volume, that is, in the growth phase, and it is preferred for maintaining a high acidification activity of acetic acid bacteria and obtaining economically a high acetic acid concentration higher than 18% weight by volume to maintain the temperature to be controlled at 18°-24° C. in the phase following the growth phase, i.e., in the acidification phase.

However, although it has been confirmed that the acidification acitivity of acetic acid bacteria in the acidification phase can be kept by artificially lowering the fermentation temperature as described above, if the fermentation temperature is lowered at a too low acetic acid concentration, i.e., in an earlier period of the growth phase, it inhibits the multiplication of acetic acid bacteria, which results in making it impossible to further maintain the activity of acidification. And hence on considering this matter, the following experiments were practiced for determining the optimum acetic acid concentration at the case of lowering the fermentation temperature.

That is, a broth prepared using alcohol, water, finished vinegar, and nutrients for acetic acid bacteria was charged in the submerged fermentation tank as used in the above-described experiments in such manner that the acetic acid concentration became 6.5% weight by volume and the alcohol concentration 3.0% volume by volume, and while controlling the temperature of the broth to 29° C. using a control thermometer, the broth was innoculated with acetic acid bacteria to initiate the fermentation. When the fermentation proceeded and the acetic acid concentration became 8% weight by volume, alcohol began to feed as in the above-described experiments. When the fermentation further proceeded and the acetic acid concentration was increased, the fermentation was continued by setting the temperature of the fermenting broth at 22° C. and the fermentation was further continued while feeding, if necessary, alcohol, until the acidification stopped. The experiment was repeated while changing variously the acetic acid concentration of the fermenting broth when the temperature setting was changed from 29° C. to 22° C. The results are shown in Table 2.

TABLE 2

| Acetic acid concn. (% weight by volume) when the temp. of fermenting broth changed from 29° C. to 22° C. | Final acetic acid concn. (% weight by volume) | Mean acidification rate* |
|---|---|---|
| 8.53  | 16.10 | 0.03 |
| 9.62  | 16.33 | 0.02 |
| 10.03 | 17.05 | 0.04 |

TABLE 2-continued

| Acetic acid concn. (% weight by volume) when the temp. of fermenting broth changed from 29° C. to 22° C. | Final acetic acid concn. (% weight by volume) | Mean acidification rate* |
|---|---|---|
| 11.05 | 17.82 | 0.06 |
| 12.01 | 20.81 | 0.15 |
| 13.10 | 20.68 | 0.14 |
| 14.08 | 20.34 | 0.12 |
| 15.02 | 19.96 | 0.11 |
| 16.01 | 17.75 | 0.03 |
| 17.00 | 17.51 | 0.01 |

*The mean acidification rate is same as described in regard to Table 1.

From the experimental results (the results shown in Table 2), it has been found that when the temperature of the fermenting broth is lowered in the state that the acetic acid concentration is lower than 12% weight by volume, an inhibition of the multiplication of acetic acid bacteria occurs, which exerting bad influences on the subsequent activity of acidification and when the temperature is lowered in the state that the acetic acid concentration is over 15% weight by volume in the acidification phase, the activity of acidification is inhibited, which results in further reducing the final acetic acid concentration as well as the mean acidification rate. Thus, it has been found to be a necessary condition for obtaining a high acetic acid concentration and economically producing vinegar with high acetic acid concentration to lower the temperature of the fermenting broth when the acetic acid concentration of the fermenting broth is in the range of 12–15% weight by volume.

Thus, the process of this invention can be practiced according to the process for producing vinegar by a conventional submerged fermentation except that the temperature of the fermenting broth is maintained at 27°–32° C. until the acetic acid concentration of the fermenting broth after the initiation of the fermentation reaches 12–15% weight by volume and thereafter the temperature of the fermenting broth is lowered to 18°–24° C. during fermenting in the subsequent acidification phase.

In more detail, as the broth used in this invention, a broth prepared by using alcohol, water, finished vinegar or acetic acid, and nutrients for acetic acid bacteria (e.g., sake cake extract, yeast extract, inorganic acids, saccharides, and organic acids) is used. As the submerged fermentation tank for performing the fermentation, a tank wherein a relatively small amount of air (for example, 5–30%/min. to the amount of a fermenting broth in the tank) aerated in a fermenting broth in the tank is sufficiently mixed, such as, for example, an aeration, agitation fermentor, an air lift fermentor, a gas entrained fermentor, etc., is used since both alcohol which is the main raw material and acetic acid which is the main product are volatile. Also, as the fermentation process, a proper process selected from the group consisting of a batch process, a continuous batch process, a combination of the aforesaid two processes and alcohol feeding, a two stage process combined a continuous batch process and a batch process, etc., may be used. Furthermore, the innoculation with acetic acid bacteria as well as the aging, filtration, pasteulization for forming vinegar from the finished vinegar after finishing the fermentation can be practiced by conventional means.

Thus, according to the process of this invention, a finished vinegar having an acetic acid concentration higher than 18% weight by volume can be obtained with a high efficiency by a submerged fermentation and a vinegar having an acetic acid concentration higher than 18% weight by volume can be produced by aging, filtrating, and pasteurizing the finished vinegar according to conventional means. And also by maintaining the fermenting broth at a lowered temperature in the acidification phase according to this invention, the loss due to evaporation of alcohol which is the main raw material for vinegar and acetic acid which is the main product can be restrained as low as possible. As described above, the process of this invention is very useful as a process for producing vinegar by submerged fermentation.

The following examples are intended to illustrate this invention but not to limit in any way.

EXAMPLE 1

An about 25 kiloliter submerged fermentation tank (fermentation tank A) and an about 17 kiloliter submerged fermentation tank (fermentation tank B) each equipped with an agitator for finely dispersing air introduced from the outside in the fermentation tank, a control thermometer, and a defoamer at the inside thereof and a rotor meter for air connected to the outside thereof were connected to a pump having a delivery rate of 2 kiloliters/min. by a pipe having an inside diameter of 100 mm in such a manner that a fermenting broth could be rapidly transferred from the fermentation tank A to the fermentation tank B.

Then, 18 kiloliters of a broth having an acetic acid concentration of 6.5% weight by volume and an alcohol concentration of 3.5% volume by volume prepared using denatured alcohol, water, finished vinegar, a sake cake extract, a yeast extract, and a proper amount of inorganic salts was charged in the fermentation tank A. Thereafter, the broth was heated to 30° C. by the aid of the control thermometer and then while maintaining the broth at 29°–30° C., the aeration and agitation for the broth was started by actuating the agitator at an amount of aerating air of 2,500 liters/min. and an agitation rate of 500 r.p.m. Then, the broth was inoculated with acetic acid bacteria. After 25 hours since then, the acetic acid concentration of the fermenting broth became 6.7% weight by volume, thereby proceeding of fermentation was confirmed.

Thereafter, when the fermentation further proceeded to increase the acetic acid concentration to 8.5% weight by volume, denatured alcohol having an alcohol concentration of about 50% volume by volume was begun to feed at a rate of about 87 liters/hour. After 33 hours since the initiation of the feeding of denatured alcohol, that is, when about 2.9 kiloliters of the denatured alcohol was fed, the acetic acid concentration and the alcohol concentration of the fermenting broth became 12.1% weight by volume and 2.9% volume by volume respectively. Thus, the feeding of denatured alcohol was stopped, the fermenting broth was withdrawn from the fermentation tank A except 9 kiloliters of the fermenting broth, which was left in the tank, by means of the pump without interrupting the aeration and agitation, and thereafter about 9 kiloliters of a mash having an acetic acid concentration of about 0.9% weight by volume and an alcohol concentration of about 4.1% volume by volume prepared using denatured alcohol, water, finished vinegar, a sake cake extract, a yeast extract, and a proper amount of inorganic salts was charged in the fermentation tank A.

After the feeding of the mash, the acetic acid concentration and the alcohol concentration became 6.5% weight by volume and 3.5% volume by volume respectively. Thereafter, when the fermentation further proceeded and the acetic acid concentration of the fermenting broth became 8.7% weight by volume after about 20 hours, thereby proceeding of the fermentation at a good rate was confirmed, denatured alcohol was begun to feed to the fermenting broth at a rate of about 120 liters/hour. When after about 20 hours since the initiation of the feeding of denatured alcohol, the acetic acid concentration of the fermenting broth became 12.2% weight by volume, the feeding of denatured alcohol was stopped, about 11.6 kiloliters of the fermenting broth was transferred into the fermentation tank B by means of the pump while leaving about 9 kiloliters of the fermenting broth in the tank A without interrupting the aeration and agitation, and thereafter, about 9 kiloliters of the mash having the same composition as described above was charged in the fermentation tank A to continue the fermentation. Thus, the fermentation cycle by the continuous batch process was repeated in the fermentation tank A.

On the other hand, in the fermentation tank B in which about 11.6 kiloliters of the fermenting broth had been transferred, the temperature of the fermenting broth was lowered to about 22° C. by means of the control thermometer which was set to 22° C. simultaneously with the transfer of the fermenting broth into the tank B and thereafter, the fermenting broth in the tank B was maintained at 21.8°–22.2° C. When about 300 liters of the fermenting broth was transferred in the fermentation tank B, the fermentation was continued by actuating the aerator and agitator and simultaneously with the completion of the transfer, denatured alcohol was begun to feed.

After about 21 hours since the initiation of the feeding of denatured alcohol, the acetic acid concentration and the alcohol concentration of the fermenting broth became 15.2% weight by volume and 2.0% volume by volume respectively and the amount of the denatured alcohol fed by then was about 780 liters. Furthermore, after 38 hours since the initiation of the feeding of denatured alcohol, the acetic acid concentration and the alcohol concentration of the fermenting broth became 17.4% weight by volume and 1.6% volume by volume respectively and the amount of the denatured alcohol fed by then was about 1.5 kiloliters. When the fermentation was further continued and the acetic acid concentration and the alcohol concentration of the fermenting broth became 19.9% weight by volume and 0.5% volume by volume after about 66 hours since the initiation of the feeding of denatured alcohol, the feeding of denatured alcohol was stopped and then the fermentation was further continued. The amount of the denatured alcohol fed by then was about 2.1 kiloliters.

Thereafter, when the acetic acid concentration and the alcohol concentration of the fermenting broth became 20.1% weight by volume and 0.2% volume by volume respectively after about 4 hours since the stopping of the feeding of denatured alcohol, the actuations of the aerator and agitator and the control thermometer for the fermentation tank B were stopped and about 13.7 kiloliters of total finished vinegar was collected.

Then, by repeating 10 times the aforesaid fermentation process wherein a fermenting broth having an acetic acid of about 12% weight by volume and an alcohol concentration of about 3% volume by volume was transferred from the fermentation tank A into the fermentation tank B by the same manner as described above and the fermentation of the fermenting broth was continued in the tank B as described above, finished vinegar having an acetic acid concentration of 20.0% weight by volume on the average was obtained.

By aging, filtrating, and pasteurizing the finished vinegar by conventional means, vinegar having a high acetic acid concentration was obtained.

EXAMPLE 2

In a 25 kiloliter submerged fermentation tank equipped with an agitator for finely dispersing air introduced from the outside in a liquid in the tank a cooling coil, and a defoamer and connected with a rotor meter for air was charged 15 kiloliters of a broth having an acetic acid concentration of 6.5% weight by volume and an alcohol concentration of 3.5% volume by volume prepared using a mixture of denatured alcohol, water, unfiltered white vinegar, sugar, inorganic salts, and yeast extract, and then aeration and agitation were started at an amount of aerating air of about 2,000 liters/min. When the temperature of the broth reached 30° C., the temperature of the broth was maintained at 28°–30° C. by the aid of the control thermometer.

On the other hand, in a 15 kiloliter submerged fermentation tank having the fittings as in the above-mentioned fermentation tank was charged a broth prepared using the saw raw materials as described above and then a submerged fermentation was performed by a so-called continuous batch process. When the acetic acid concentration became about 7% weight by volume after finishing the charging of the broth, 1,500 liters of the fermenting broth was rapidly innoculated into the broth in the above-described 25 kiloliter fermentation tank by means of a self-priming pump without interrupting the aeration. In this case, the alcohol concentration of the fermenting broth used for the innoculation was about 3% volume by volume. Also, the acetic acid concentration and the alcohol concentration of the broth in the 25 kiloliter fermentation tank thus innoculated were 6.55% weight by volume and 3.45% volume by volume respectively.

After 4 hours since the innoculation, the acetic acid concentration increased by 0.41% weight by volume and hence it was confirmed that a fermentation was started with a short lag phase. Furthermore, when the acetic acid concentration and the alcohol concentration of the fermenting broth became 8% weight by volume and 1.9% volume by volume after 6 hours since the innoculation, denatured alcohol having an alcohol concentration of 50% volume by volume was begun to feed.

When after 20 hours since the initiation of the feeding of denatured alcohol, the amount of the alcohol fed became about 1,900 liters and the acetic acid concentration of the fermenting broth became 12.2% weight by volume, the setting of the control thermometer was changed to 20° C. Thus, the temperature of the fermenting broth was lowered and thereafter the temperature thereof was maintained at 19.8°–20.2° C. After 43 hours since lowering the temperature of the fermenting broth, the acetic acid concentration and the alcohol concentration of the fermenting broth became 19.5% weight by volume and 1.3% volume by volume respectively and then the feeding of denatured alcohol was stopped. In this case, the total volume of the fermenting broth was 22,600 liters.

When the fermentation was further continued, the acetic acid concentration and the alcohol concentration of the fermenting broth became 20.5% weight by volume and 0.2% volume by volume respectively, then the actuations of the aerator and agitator and control thermometer were stopped and about 22,600 liters of the whole finished vinegar was collected.

Also, by further repeating 5 times the batch process as described above, finished vinegar having an acetic acid concentration of 20.3% weight by volume on the average was obtained.

By aging, filterating and pasteurizing the finished vinegar by conventional means, vinegar having a high acetic acid concentration was obtained.

What is claimed is:

1. A process for the production of vinegar by a submerged fermentation, which comprises maintaining the temperature of a fermenting broth at 27°–32° C. until the acetic acid concentration of the fermenting broth after the initiation of the fermentation reaches 12–15% weight by volume and thereafter maintaining the temperature of the fermenting broth at 18°–24° C. until finished vinegar having an acetic acid concentration higher than 18% weight by volume is obtained.

* * * * *